Oct. 10, 1961   H. B. HUNTRESS   3,003,588
FRICTION COUPLES
Filed Sept. 14, 1959
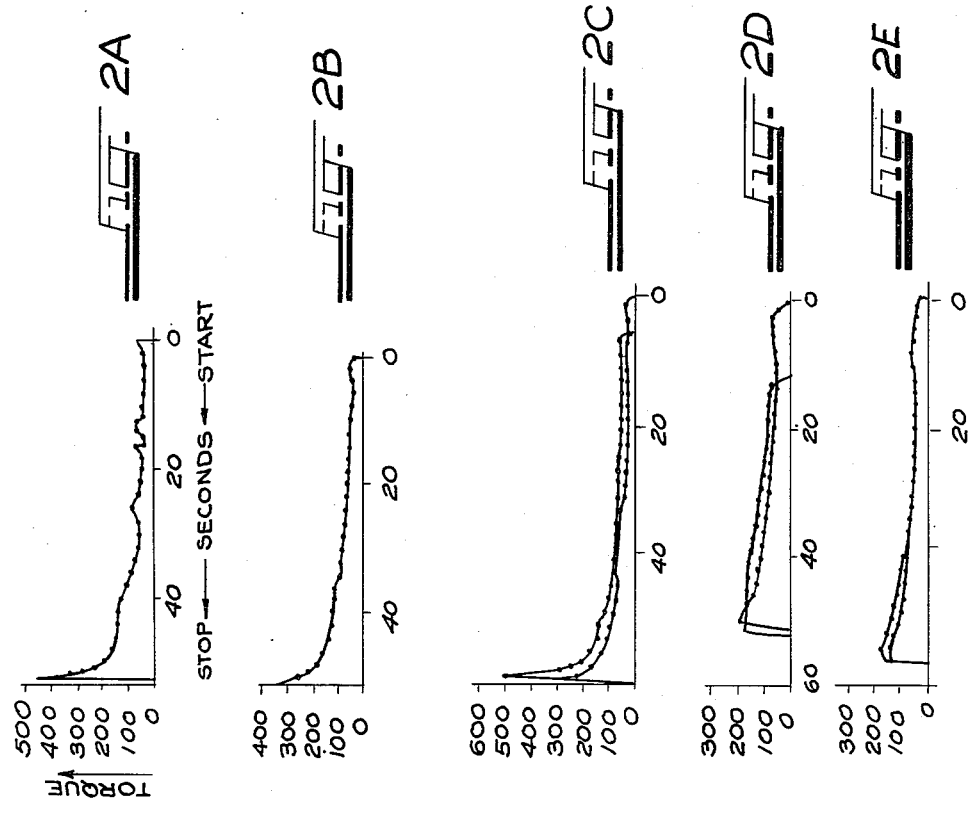
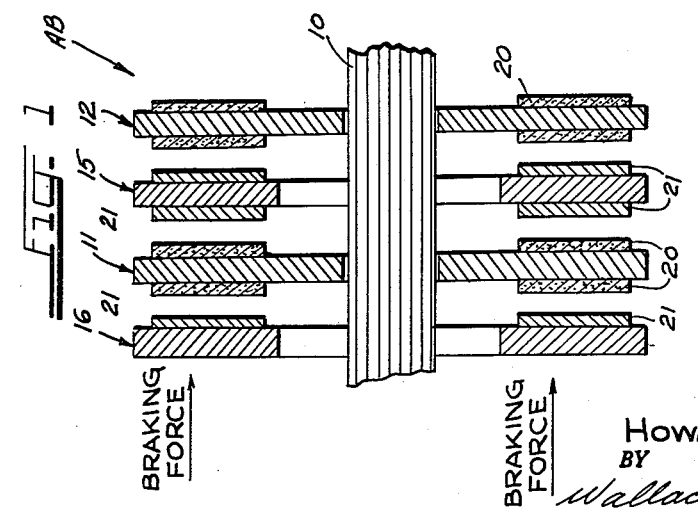
INVENTOR.
HOWARD B. HUNTRESS
BY
Wallace and Cannon
ATTYS.

United States Patent Office 3,003,588
Patented Oct. 10, 1961

3,003,588
FRICTION COUPLES
Howard B. Huntress, Suffern, N.Y., assignor to American Brake Shoe Company, New York, N.Y., a corporation of Delaware
Filed Sept. 14, 1959, Ser. No. 839,897
2 Claims. (Cl. 188—71)

This invention relates to friction couples and in particular to friction couples that are to be used in aircraft brake structure. This application is a continuation-in-part of application Serial No. 652,130, filed April 11, 1957.

Heavy duty brake structure of the kind used in commercial and military aircraft today generally employ powdered metal friction elements as the expendable friction facings, and this is so for the reason that friction elements of powdered metal are capable of withstanding the high temperatures and tremendous high energy levels involved during the course of braking the landing aircraft.

Heretofore, one acceptable material for such friction elements has been a bronze base essentially of powdered copper and tin, but in view of advances in aircraft design and in particular the prospects of still even bigger aircraft, it has been recognized that bronze base materials will ultimately prove unacceptable. It has been proposed to overcome this problem by equipping friction couples of the foregoing kind with powdered metal facings essentially of properly bonded intermetallic compounds, and the present invention is primarily concerned with friction elements composed essentially of inter-metallic compounds.

The proper design of a friction couple, particularly for aircraft brakes, involves numerous subtle factors. One of the most noteworthy among these is the attainment of proper torque characteristics, and in the circumstances involved torque values are a measure of the amount of twist exerted by the rotor member against the stator member in the friction couple. This twist, for the most advantageous operation, when measured on a dynamometer should show no sharp so-called "bite-in" at the beginning of friction couple engagement and should show no so-called "peaking" at the termination of engagement. During engagement the torque curve obtained from the dynamometer should be as smooth as possible demonstrating the lack of vibration or rough operation. These considerations are exeremely important inasmuch as failure to conform to such desirable conditions results in gouging of the friction faces of the members in the friction couple, vibration, and undue strain on the brake struts.

In view of the foregoing, the primary object of the present invention is to so modify a friction couple from the standpoint of friction facing materials as to eliminate undesirable torque conditions. Specifically, the object of the present invention is to face one of the members of a friction couple with a powdered metal friction element essentially of nickel-bonded nickel aluminide intermetallic and containing alumina, and to face the opposing member of the friction couple with substantially pure molybdenum metal. While the present invention has been introduced from the standpoint of considerations given to aircraft brakes, it will be appreciated that a friction couple of the kind contemplated can also be used to advantage as a heavy-duty clutch in heavy-duty industrial equipment and earth moving equipment.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a sectional view showing somewhat schematically a typical aircraft brake representing one form of friction couple in which the present invention is embodied; and FIGS. 2A, 2B, 2C, 2D and 2E show torque performances of materials tested in accordance with the present invention.

Based on dynamometer data to be discussed hereinafter, it has been found in accordance with the present invention that optimum torque characteristics for friction couples faced with friction elements composed in part of intermetallic compounds are obtained by using molybdenum metal as the facing on one of the members of the friction couple.

The other member of the friction couple is faced with a friction element composed of powdered nickel aluminide pressed and sintered with powdered nickel which bonds the intermetallic powders into a solid and dense body during the course of sintering and pressing. Thus, during sintering and pressing, the nickel binder metal powders and the intermetallic compound particles weld one to another as a result of surface diffusion and become consolidated into a unitary matrix. Advantageously, the friction element containing nickel aluminide also contains powdered alumina which is found to improve wear characteristics and to impart additional heat resistance.

The intermetallic compounds are obtained in the first instance by reacting the component metals in stoichiometric quantities and under conditions assuring purity of the resultant intermetallic compound, and the resultant intermetallic material is then granulated into the desired mesh size (—100 mesh) typical of metal powders used in the formation of powdered metal friction elements. The intermetallic powders thus obtained are then mixed with the desired amount of powdered nickel metal of substantially the same mesh size, and are also mixed with alumina. The alumina or equivalent hard, wear and heat resistant ceramic can vary from 20 to 220 mesh. Advantageously, the facings are in the form of buttons or arcuate segments such as 120° segments, and are secured to a disc-type backing member to complete construction of the rotor and stator of the friction couple as will be explained.

The following is an example of production of the intermetallic facing material, which was used in the various friction couple combinations tested on the dynamometer hereinafter discussed.

EXAMPLE 1

*(For Test Part No. 36 hereinafter)*

| Material: | Parts by weight |
|---|---|
| NiAl (—100 mesh) | 55 |
| Ni (—100 mesh) | 25 | 
| $Al_2O_3$ (20 to 220 mesh) | 20 |

The materials of Example 1 are mixed to a homogeneous state and measured amounts are then placed in graphite dies corresponding to the desired configuration of the ultimate sintered facings. Each mixture is then hot pressed in its die to the desired thickness (about ¼" for example) under pressures of from 1000 to 5000 p.s.i. and at a temperature of from about 2200–3000° F. maintains for as long as 30 minutes. Conditions can be varied within the foregoing ranges depending upon the degree of consolidation and density desired for the facing. After completion of the hot press sinter operation, operative nickel aluminide intermetallic friction facings or elements are obtained, and these are then secured to backing members of a suitable metal to afford the stator or rotor member of the friction couple. Such securement can be by way of brazing or a mechanical interlock effected by riveting, or mounting the facings in flanged cups or channels in turn secured in any desired and effective manner to the backing member.

Referring to FIG. 1, there is illustrated an aircraft brake structure AB including a center shaft 10 which will rotate with the wheels of the aircraft during take-off and landing. The shaft 10 is splined, and rotor members 11 and 12 have toothed openings at the center thereof and are slipped onto the shaft 10 to be driven thereby. Alternately spaced among the rotors are stator members as 15 and 16, and as indicated by legend in FIG. 1, a braking force will be exerted on an outer one of the stators to produce engagement of the facings on the members of the friction couple. The means by which the stators are guided and supported are not shown.

The rotors include suitable metal plates of disc form faced with friction elements 20 composed in accordance with Example 1, and the stators include suitable metal plates of disc form faced with opposing members 21 consisting of substantially pure forged molybdenum metal, the members 21 being engageable by the members 20 during friction couple engagement.

In arriving at the combination of the present invention comprising a nickel-bonded nickel aluminide powdered metal friction element and a substantially pure molybdenum metal plate opposing member, various different forms of opposing members were tested on a dynamometer in combination with the aforementioned powdered metal friction element. The combinations tested are listed hereinafter in Table 1, and performance characteristics from the standpoint of torque are shown in FIG. 2 which is a group of curves depicting exactly those obtained from the actual dynamometer tests.

TABLE 1

*Combinations tested*

| Rotor Facing | Stator Facing | Torque |
|---|---|---|
| Part No. 36 vs. | Part No. 36 | FIG. 2A |
| Part No. 36 vs. | 1018 steel | FIG. 2B |
| Part No. 36 vs. | Timken 1722–AS steel | FIG. 2C |
| Part No. 36 vs. | Molybdenum [1] | FIG. 2D |
| Part No. 36 vs. | Molybdenum [2] | FIG. 2E |

[1] Run in air.
[2] Run in nitrogen.

The starting speed on the dynamometer in each instance was 970 r.p.m., and 40 to 50 seconds was required for a stop while duplicating actual aircraft landing conditions. The intermetallic friction elements (Part No. 36) were rings of six inch inside diameter, eight inch outside diameter, and the plates used as the opposing members were of complementary form.

Referring to FIG. 2A, it will be noted that the torque curve resulting from running the intermetallic against itself (Part No. 36 vs. Part No. 36), as an opposing member is unsatisfactory due to the very sharp increase in torque at the end of the stop, this being a situation which cannot be tolerated in aircraft braking. Substantially the same situation prevails when running the nickel-aluminide intermetallic friction element against plain carbon 1018 steel (FIG. 2B) ond Timken 1722–AS steel, the latter of which in particular is a common opposing plate material for standard aircraft brakes, both commercial and military. Other opposing plate materials known to possess heat resistance and other satisfactory high temperature characteristics were also tested, such being inclusive of certain stainless steels and chromium-plated steel, but these materials as opposing plates were also found to be unsatisfactory from a torque standpoint in comparison to the results achieved under the present invention as depicted in FIGS. 2D and 2E.

Thus, in accordance with the present invention it is found that satisfactory torque characteristics are obtained when the nickel-aluminide intermetallic element is run against substantially pure molybdenum metal. The molybdenum metal used contained 0.5% titanium, present merely to facilitate the fabrication of the molybdenum plate since absolutely pure molybdenum is a metal extremely difficult to fabricate and work. It was found that the friction of the intermetallic material against the molybdenum was advantageously high, and moreover there was only a gradual increase in torque toward the end of the stop as shown in FIG. 2D.

Since molybdenum is highly oxidizable in air, and since the operating temperature at the time of friction coupling is known to be as high as 1600 to 1800° F. just under the surface, it was found that molybdenum was oxidizing at a rapid rate even during the dynamometer testing causing molybdenum trioxide to condense. This characterized what might be considered under some circumstances to be rather rapid wear, but this is not a drawback because in most instances aircraft brakes are purposely designed for replaceable linings, and moreover high wear rates in the present instance are over-balanced by satisfactory torque achieved under the present invention.

In order to determine if the molybdenum trioxide was possibly giving rise to the achievement of satisfactory torque, a test was run with an atmosphere of nitrogen surrounding the friction couple to prevent oxidation. Thus in one test the dynamometer brake was completely enclosed, and a continuous supply of nitrogen was fed to the interior so that stops were run in an ambient atmosphere of nitrogen rather than air. The molybdenum did not oxidize, and the resultant torque curves depicted in FIG. 2E in essence are substantially the same as those of 2D where the dynamometer brake was run in air.

It will be seen from the foregoing that the use of molybdenum metal for the facing for a friction couple member and acting in opposition to a friction element essentially of nickel-bonded nickel aluminide, accounts for smooth torque performance. This is important in eliminating vibration, gouging of one of the friction elements, and undue stressing of related parts of the friction couple during engagement. These satisfactory results are not achieved by having nickel-bonded nickel aluminide in both facings. Nor are satisfactory results achieved by substituting other metallic facings therefor such as plain carbon, stainless, chromium-plated and Timken grade high temperature steels.

It should be mentioned that so long as the operative combination described herein is utilized, it is immaterial whether the corresponding friction facings or elements be on the stator or rotor. It will be realized that the form of molybdenum metal used in the present instance merely represents a relatively inexpensive commercial form of molybdenum readily obtainable, and hence other forms of substantially pure molybdenum can be used.

Hence, while I have illustrated and described a preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A friction couple comprising a rotary plate member and an opposing plate member engageable one with another, one of said members being separately faced with a powdered metal friction element essentially composed of a matrix of nickel aluminide intermetallic bonded by and sintered with nickel metal, and containing a hard ceramic in the matrix imparting enhanced wear and thermal resistance thereto, and the other of said members being separately faced with substantially pure molybdenum metal, said facings being disposed opposite one another in the friction couple.

2. A friction couple comprising a rotary member and an opposing member engageable one with another, one of said members being a metal plate faced with a powdered metal friction element having a matrix essentially composed of nickel aluminide intermetallic bonded by and sintered with nickel metal, and the other of said members being faced with substantially pure molybdenum metal, said facings being disposed opposite one another in the friction couple.

References Cited in the file of this patent

UNITED STATES PATENTS 2,751,668    Turner _____ June 26, 1956

FOREIGN PATENTS 816,169    Great Britain _____ July 8, 1959